United States Patent [19]
Mc Vey et al.

[11] Patent Number: 5,815,302
[45] Date of Patent: Sep. 29, 1998

[54] VIEWING APPARATUS WITH A COUNTERBALANCED AND ARTICULATED MIRROR

[75] Inventors: Ray E. Mc Vey, El Segundo; Yeong-Wei A. Wu, Rancho Palos Verdes; John J. Anagnost, Torrance, all of Calif.

[73] Assignee: Hughes Electronic, El Segundo, Calif.

[21] Appl. No.: 540,736

[22] Filed: Oct. 11, 1995

[51] Int. Cl.⁶ .............................. G02B 7/182; G02B 26/08
[52] U.S. Cl. .......................... 359/214; 359/221; 359/225; 359/872; 359/877
[58] Field of Search ..................................... 359/198, 199, 359/213, 214, 220, 225, 221, 554, 555, 402, 405, 872, 874, 876, 877, 900

[56] References Cited

U.S. PATENT DOCUMENTS

| | | | |
|---|---|---|---|
| 2,911,470 | 11/1959 | Greenleaf et al. | 359/214 |
| 3,383,154 | 5/1968 | Reed . | |
| 3,575,496 | 4/1971 | Paduck | 359/220 |
| 3,612,643 | 10/1971 | Weber | 359/221 |
| 3,797,908 | 3/1974 | Waro et al. | 359/220 |
| 4,439,003 | 3/1984 | Roth . | |
| 4,678,289 | 7/1987 | Mattelin et al. | 359/876 |
| 4,746,206 | 5/1988 | Kusztos et al. . | |
| 4,764,002 | 8/1988 | Wilson . | |
| 4,883,347 | 11/1989 | Fritzel | 359/876 |
| 5,075,861 | 12/1991 | Hasson et al. . | |

FOREIGN PATENT DOCUMENTS 140247  8/1982  Japan ...................................... 359/876

OTHER PUBLICATIONS

JP 4201749 Abstract.

*Primary Examiner*—Rickey D. Shafer
*Attorney, Agent, or Firm*—Leonard A. Alkov; William C. Schubert; Glenn H. Lenzen, Jr.

[57] ABSTRACT

An articulated viewing apparatus (10) has a pair of elevational actuators (56, 78), one of which is a coarse-position actuator (56) and the other of which is a fine-position actuator (78), and each of which pivots a mirror head (28) about respective parallel elevational axes (54, 66'). Pivotal movements of the mirror head (28) direct the line of sight of a viewer looking outwardly through a window (22). The window (22) may be formed in the wall of a vehicle or may be at the upper end of a periscope tube, for example, and includes a transparent material (24). This window (22) may admit light to an optical sensor or to the user's eye directly. The coarse-position elevational actuator (56) is positioned so that its axis (54) is located as close as possible to an edge of the mirror head (28) and close to the inner surface of the window glazing (24) so that the size of the window (22) is minimized with respect to the size of the optical aperture and field of view provided to the user of the apparatus (10). The fine-position actuator (78) is attached to the mirror head (28) at a respective axis (66') approximately at the geometric center of the mirror (28), so that the mirror (28) is statically balanced about the fine-position elevation axis (66') of this actuator (78).

30 Claims, 4 Drawing Sheets

VIEWING APPARATUS WITH A COUNTERBALANCED AND ARTICULATED MIRROR

BACKGROUND OF THE INVENTION

1. Field of the Invention

The present invention relates to viewing apparatus used in vehicles. More particularly, the present invention relates to such a viewing apparatus which employs a counterbalanced and articulated mirror to direct a view or line of sight through an optical aperture. The optical aperture may be defined by an outer wall of the vehicle, and will be closed by a glazing material. The view or line of sight of a user of the viewing apparatus may pass through this optical aperture at a variable angle to the plane of the aperture in order to allow the user to see different parts of the outside scene. This optical aperture may be defined by a viewing window of an armored vehicle or by a periscope of a submarine, for example. The articulated mirror is moved both to direct the view through the optical aperture in the elevational plane, or alternatively both in the elevational plane and in the azimuthal plane, and also to compensate both in the elevational and azimuthal planes for movements of the vehicle. As a result, a stabilized view outwardly through the optical aperture is provided to a user inside the vehicle.

2. Related Technology

Viewing systems of various types are commonly used in vehicles to provide personnel within the vehicle with a view outside. A simple window opening in the vehicle through which those inside may look out is probably the simplest expedient for this purpose. The simple viewing slits of early armored vehicles are an example of this expedient. A glazing material may be applied at such a simple window opening to provide environmental protection. Further, since the inception of armored vehicles, windows in the form of viewing slits, prismatic periscope-like devices, and periscopes have been used to provide personnel within an armored vehicle with a view of the outside world. In some cases these periscopes include plural mirrors and are rotational so that the user can sweep the device in azimuth across the horizon. In other cases, the periscope-like devices take the form of a plurality of prisms set into a cupola of the vehicle in a circular array around the location for one of the vehicle crew. In this case, the crew member of the vehicle is presented with a circumferential plurality of adjacent images representing segments in azimuth outside the vehicle. Understandably, the crew member's view in the elevational direction is very limited.

In each of these cases, the view provided to the user of the device is not stabilized or compensated for movement of the vehicle. As a result, when the vehicle is in motion, the user may experience considerable difficulty viewing the outside world because the images provided are jittery or blurred by the motion of the vehicle.

A more modern and effective viewing expedient used currently in armored vehicles, such as tanks and armored cars for example, employs a common motion-compensated viewing apparatus with a rather large window mounted in an opening on a cupola of the vehicle. The cupola is commonly mounted to a turret of the vehicle so that coarse azimuthal direction of the view through the window is achieved by pivoting of the turret about a vertical axis. In order to direct the view through the window in elevation, a mirror is mounted behind the window and is pivoted about a horizontal elevational axis disposed generally at the geometric and mass center of the mirror. This pivoted mirror directs light coming through the window from an outside scene downwardly to a light-transmission optical system or to an optical sensor. In the case of an viewing system using a light-transmission optical system (such as a telescope system), the user of the system receives at an eyepiece for direct viewing of the outside scene light which has entered through the window. With a viewing system using an optical sensor, such as a charge-coupled device, light entering through the window is directed from the pivoted mirror onto the sensor, and the user views the outside scene on a television monitor.

In either case, the user uses a remote control device to pivot the mirror about the horizontal elevational axis in order to direct the view in elevation. This feature allows the viewer to look upwardly and downwardly within a certain angle (in addition to viewing horizontally outwardly) through the window. Such a viewing system conventionally includes compensations for fine elevational and fine azimuthal perturbations so that the user is provided with a stabilized view of the outside scene even when the vehicle is in motion over rough terrain.

A similar viewing system may be incorporated into the periscope of a submarine in order to allow a user within the submarine to look horizontally out across the water, as well as being able to look upwardly toward the sky. In this latter case, the stabilization of the view provided by the system would compensate for rolling and pitching of the submarine.

With these conventional systems, gyroscopic sensing (angular rate sensing, for example) and compensation is provided by actuators which control the position of the pivoted mirror about both the horizontal fine-elevation axis and about a vertical fine-azimuthal axis. The movements provided to the mirror by these actuators compensates for movements of the vehicle so that the view provided to the user is stabilized. Without such compensation, the view would jiggle or jitter as a land vehicle moved, or would swing up and down with the rolling and pitching of a sea vehicle, for example.

Because such viewing systems are typically employed in military vehicles they must be designed for rough use and use in hostile environments. The window of the conventional viewing system is a critical component of the entire system in terms of vulnerability to enemy sighting and hostile action, particularly because the size of this window relates to the observability of the vehicle by the enemy. Furthermore, the window is also vulnerable to natural hazards found in the use environments for military vehicles. Compared to the strength of the exterior armor of a tank or armored car, the window is very fragile and vulnerable. In the case of submarine viewing systems, the window is similarly much more susceptible to damage than is the outer hull of the submarine and must be able to sustain the water pressure when the submarine is submerged. Also, the safety of the crew is dependent upon the reliability of the window.

It follows that the smaller the window for such a viewing system can be made, the more desirable the viewing system is for reducing observability of the vehicle using the system. Therefore, the size of the window should be minimized while still maintaining the desired field of regard (i.e., the angle through which the user's view may be moved in elevation).

Conventional viewing systems have employed a pivoted mirror which is supported near its geometric center, and hence near its center of gravity, so that linear motion of the vehicle as it moves does not have a torquing effect on the mirror which would shift the user's view. As a result, the pivoting movements of the mirror about the horizontal elevation axis result in the edges of the mirror swinging through a considerable arc. The edge of the mirror which is closest to the inside of the window must be spaced away from the window so that the mirror does not hit the window anywhere in its arcuate movement about the horizontal elevational axis.

The size of the mirror is related to the field of view and optical aperture size provided by the viewing system. With a particular size of mirror, the field of regard in the elevational direction (i.e., the angle through which the field of view may be moved in the elevational direction) is related to the size of the arc through which the mirror edges swing. With the conventional viewing system, the window size in the vertical direction is determined by the mirror size, field of regard (i.e., angular movement of the mirror in the elevational direction) and the necessary clearance to prevent the closest edge of the mirror from striking the inside of the window. This type of conventional mirror mounting has necessitated an undesirably large window size in order to provide the user with the desired optical aperture, field of view, and field of regard angles.

Accordingly, it would be desirable in the field of viewing systems, particularly those viewing systems used in military applications, for a viewing system which would minimize the size of the window in the vertical direction with respect to the size of the field of regard provided by the system while still maintaining a desired optical system design and a stabilized view.

SUMMARY OF THE INVENTION

In view of the deficiencies of the conventional technology, a primary object for this invention is to over come one or more of these deficiencies.

Another object of the present invention is to minimize the size of a window of an optical system used in a vehicle to provide a view outside without decreasing the desired field of regard of the system.

Another object for the present invention is to stabilize the view provided to a user of the viewing apparatus despite perturbations imposed on the position of the viewing apparatus by movements of an automotive land vehicle, for example, or other platform carrying the viewing apparatus.

Still another object for the present invention is to provide such a viewing apparatus in which an articulated mirror head of the viewing apparatus is counterbalanced by a device adjusting itself to every position of the mirror head.

According to one aspect, the present invention provides a viewing apparatus for selectively directing the line-of-sight of a viewer, the viewing apparatus including a selectively angulated mirror reflecting light from a scene to provide an image for the viewer, the viewing apparatus comprising a mirror; a support structure holding the mirror, the support structure including apparatus for selectively varying an angle of the mirror relative to the scene to selectively direct the viewer's line of sight, the support structure including a support arm pivoting near a first end thereof on the support structure, the support arm near an opposite second end thereof pivotally supporting the mirror, the support arm being pivotal in response to acceleration to undesirably alter the angulation of the mirror; a counterbalance, the counterbalance being movable in response to the acceleration; and linkage coupling the counterbalance to the support arm so that movement of the counterbalance in response to the acceleration opposes the pivoting of the support arm and the mirror, thereby to eliminate the undesirable alteration of the angulation of the mirror.

According to another aspect of the present invention, an optical system embodying the present invention is disposed in the interior of a vehicle and generally includes an articulate mounting structure for both moving and stabilizing the mirror with respect to elevation and azimuth axes, an optical sensor having an optical axis, a window disposed in the vehicle, and an articulated head mirror obliquely positioned near the window for directing the line-of-sight of the view provided to a user of the apparatus. By definition, the elevation axis is substantially parallel to the horizon, and the azimuthal axis is substantially perpendicular to the horizon.

More specifically, one preferred embodiment of the optical system includes an articulation system which articulates the mirror with respect to the elevation and the azimuth direction over a particular field of regard. If the mirror pivots about the elevation axis, the line-of-sight of the optical beam moves along the vertical plane (i.e., up and down on the horizon). If the mirror pivots about the azimuth axis, the line-of-sight of the optical beam moves along the horizontal plane (i.e., back and forth across the horizon).

The articulation system has a pair of actuators: a coarse actuator for driving the mirror over a large range, and a fine actuator for driving the mirror over a small range. The actuators have an arm mechanically coupled therebetween. Each actuator drives the mirror to pivot about a respective elevation axis. The coarse actuator is coupled to a movable support assembly and positioned such that the elevation axis thereof is located as close as possible to an edge of the mirror, particularly an edge of the mirror in close proximity to the window. The fine actuator is attached to approximately the geometric center of the back side of the mirror, such that the mirror is statically balanced about the elevation axis of the fine actuator.

One advantage of the optical system according to the present invention is that the window is only slightly larger than the optical beam. As the radial distance between the edge of the mirror and the elevation axis of the coarse actuator is small, the horizontal and vertical displacement of the edge of the mirror is accordingly small with respect to the angle through which the mirror pivots (i.e., the field of regard in the elevation direction). Therefore, the vertical dimension of the window has to accommodate only a small vertical displacement of the mirror in order to maintain the desired field of regard. For example, the minimum vertical dimension of the window is slightly larger than the diameter of the optical beam for a small field of regard in elevation. More generally, the vertical dimension of the window is substantially equal to or slightly larger than the diameter of the optical beam plus the vertical displacement of the edge of the mirror.

Another feature of the invention is that the head mirror is stabilized. Stabilization of the head mirror is critical to remove vibration or jitter which would cause the scene to blur to an operator. Therefore, the mirror needs to be statically balanced about an axis. If the elevation axis of the coarse actuator were the only axis of the system, then the bulk of the mass of the mirror would be located eccentric to the elevation axis, thereby resulting in substantial jitter in the mirror. Therefore, the fine actuator is positioned so that the elevation axis thereof is located at approximately the geometric center of the mirror (or near the center of gravity of the mirror), thereby statically balancing the mirror about this axis and substantially eliminating jitter which would otherwise be present.

Still another feature of the invention is that the two elevational actuators work in conjunction to drive the mirror to pivot over the desired field of regard: the coarse actuator driving the mirror quickly over a large range but with low precision, and the fine actuator driving the mirror over a small range but with high precision.

Yet another feature of the present invention is that the mirror head is inertially balanced with respect to vertical linear accelerations and horizontal linear accelerations of the platform carrying the viewing apparatus, such that these accelerations do not adversely affect the position of the line of sight of the apparatus, nor require the stabilization system for this line of sight to actively compensate for these acceleration in order to provide a stabilized line of sight for the user of the apparatus.

Additional objects and advantages of the present invention will be apparent to those ordinarily skilled in the pertinent arts from a reading of the following description of a particularly preferred exemplary embodiment of the invention, taken in conjunction with the appended drawing Figures, in which the same reference numeral indicates the same feature among all of the several views, or features which are analogous in structure or function.

DESCRIPTION OF AN EXEMPLARY PREFERRED EMBODIMENT

Figure 1:
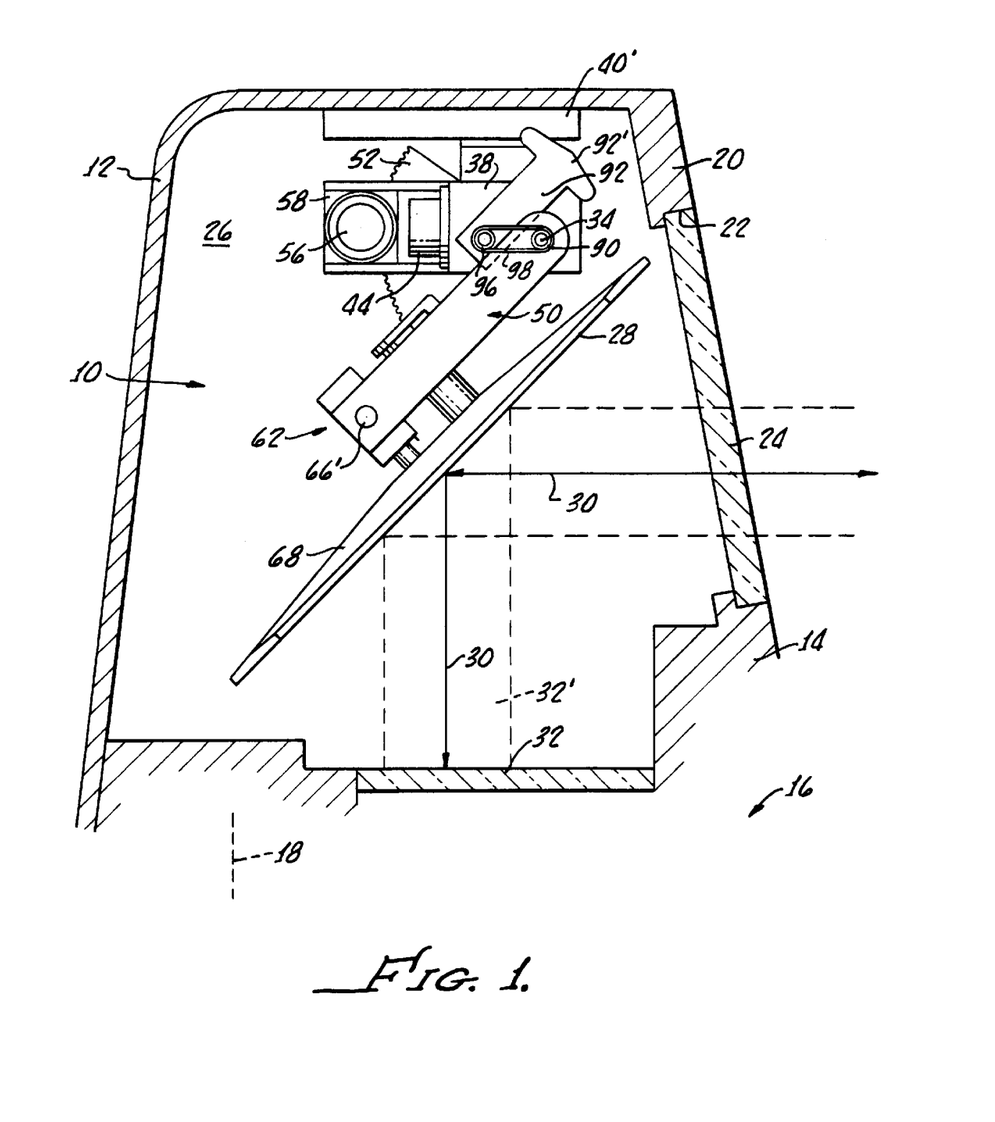
FIG. 1 is a side elevational view of a viewing system apparatus embodying the present invention.
Figure 2:
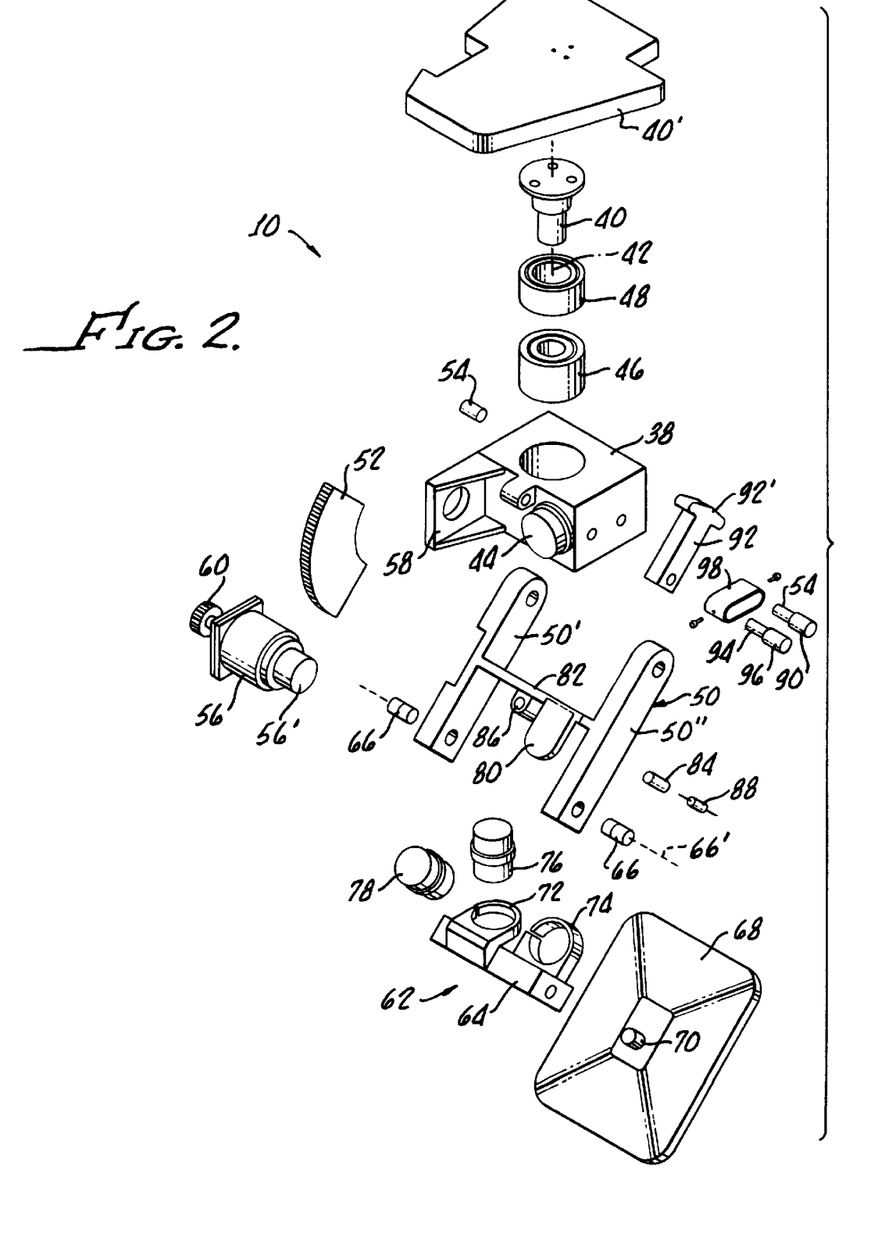
FIG. 2 provides an exploded perspective view of a viewing apparatus as is seen in FIG. 1, with parts broken away and removed for clarity of illustration.

Referring to FIGS. 1 and 2 in conjunction with one another, a viewing apparatus is generally indicated at 10. The viewing apparatus 10 is both selectively movable and is stabilized about two orthogonal axes as will be further explained. The viewing apparatus 10 is disposed, for example, within a cupola 12 carried upon a turret 14 of a vehicle, which vehicle is generally indicated with the arrowed reference numeral 16. The turret 14 is rotational about a vertical azimuthal axis, arbitrarily indicated at 18. The axis 18 may or may not pass through the cupola 12. Those ordinarily skilled in the pertinent arts will recognize that the turret 14 may alternatively take the form of a periscope tube, which periscope tube is also rotational about a vertical azimuthal axis. The vehicle 16 could be a ground vehicle (such as an armored track-laying tank or an armored car, for example), a sea vehicle (such as a submarine), or an air vehicle (such as a fixed-wing aircraft or helicopter). In the case of the submarine, the cupola 12 would be carried at the upper end of a periscope tube, which when raised above water level is rotational about a vertical azimuthal axis to provide the user with a view around the horizon. In each case, rotation of the turret and/or cupola, or of the periscope tube about the vertical azimuthal axis 18 is employed to achieve a coarse azimuthal adjustment of the direction of view or line of sight provided by the viewing apparatus 10 to a user.

The cupola 12 includes an outer surrounding wall 20, which defines a window opening 22. This window opening 22 defines an optical aperture through which a view of the world outside the vehicle 16 is to be obtained. The opening 22 is closed by a flat transparent glazing 24. In the case of an armored vehicle, the glazing 24 will be formed of a comparatively thick ballistic glass or LEXAN sheet material, for example. The outer wall 22 supports the glazing 24, and also encloses a cavity or chamber 26. This cavity 26 is open at least partially in a downward direction. Within the cavity 26, the apparatus 10 is received. Those ordinarily skilled in the pertinent arts will recognize that the apparatus 10 includes an angled mirror, generally referenced with the numeral 28. The mirror 28 is angled rearwardly and downwardly relative to the glazing 24 so that light entering through the glazing is directed downwardly (as is indicated by arrows 30). The light entering through glazing 24 and reflected from mirror 28 may be directed to a variety of imaging devices, generally indicated with the numeral 32.

The imaging devices 32 may include, without limitation, a light transmission telescope, or a light-responsive sensor, such as a charge coupled device or image intensifier tube. In the case of an imaging device which is of the light-transmission telescope type, the user of the viewing apparatus would view light received via glazing 24 at an eyepiece in order to obtain a view of the outside world. Such a telescope will have a field of view, which is the optical angle subtended by the optical system of the telescope and within which a user may view a distant object. This optical angle for field of view is representative of the field of view of the system and is indicated on FIG. 1 with the numeral 32'. The size of the mirror 28 projected in the vertical direction which is necessary for the full field of view of the optical system to be realized is determined by the size of the objective lens (not seen) of the optical system, the spacing between this lens and the mirror 28, and the angle through which the mirror 28 is to be moved to allow the user to move the view in the elevational plane. This extent of movement in the elevational plane is referred to as the field of regard of the system.

In the case in which a charge coupled, or other light-responsive sensor, is used to receive the light (arrows 30), the user would view the outside scene on a television monitor or cathode ray tube. In this case also, either the optical system associated with the sensor, or the size of the sensor itself will establish a field of view (angle 32') for the apparatus 10. In each case, the user of the apparatus 10 will be provided with a field of view which subtends several degrees in the azimuthal and elevational planes. The field of view in these two planed need not be equal to one another.

Viewing the drawing Figures, it will be understood that in addition to the coarse azimuthal adjustments of the direction of viewing (which coarse adjustments are effected by rotating the cupola 12 along with a turret or periscope tube about the vertical axis 18), the user of the viewing device 10 can selectively move the view provided by the device in an elevational sense by pivoting the mirror 28 about a horizontal axis 34. A remote control device (not shown) and actuator (to be further described below) are used to selectively effect pivotal movements of the mirror 18 about the axis 34. Thus, the user of the viewing apparatus 10 can selectively view the outside world with a field of view several degrees wide and several degrees high, with a field of regard (i.e., the angle in the elevational plane in which the user's view may be selectively moved) which also encompasses several degrees and the size of which is dependent upon the extent of pivotal freedom provided for the mirror 28 about axis 34. The apparatus 10 may possibly afford the user with a full 360 degree azimuthal view (if the turret or periscope tube can be turned through a full rotation).

In addition, in order to stabilize the view provided by the apparatus 10 despite movements of the vehicle 16, herein sometimes referred to as line-of-sight (or LOS) stabilization, gyroscopic (angular rate) sensing and angular compensation for perturbations of the mirror in both the azimuthal and elevational planes is provided. This compensation will be explained in detail below. However, in overview, and viewing FIG. 2, in order to provide fine-position compensation in the azimuthal plane, the apparatus 10 includes a turntable member 38 which carries the mirror 28. The turntable member 38 is pivotal through a comparatively small (i.e., about five degrees) angle about a vertical stem 40. The stem 40 is secured to and depends from the ceiling of the cupola 12 (via an intervening base plate member 40'), and defines a vertical fine-azimuthal compensation axis 42, which axis is substantially parallel with (although not necessarily coincident with) azimuthal axis 18. Carried on the turntable 38 is a two-axis angular rate sensor 44, which is sensitive to angular perturbations about axis 42 to provide an output signal. Because the rate sensor 44 is also sensitive to angular perturbations about another orthogonal axis, as will be explained, another second output signal is also obtained from this sensor.

Those ordinarily skilled in the pertinent arts will recognize that the angular rate sensor 44 may or may not include an actual rotational gyroscope. In the case of angular rate sensors which do not include a rotational gyroscope, a variety of well known expedients are used to provide an output signal indicative of angular change about an axis of sensitivity (i.e., about the axis 42). For example, the angular rate sensor 44 may be or include angular rate sensors of the fluidic, piezo-ceramic oscillator, quartz oscillator, fiber-optic gyro, or even of the ring laser gyro type.

A torque motor actuator 46 is disposed on the stem 40 coaxially with a bearing 48 which supports the turntable 38 from this stem. The torque motor 46 is employed to dither the mirror 28 through small azimuthal correctional angles in response to the angular rate signal provided by sensor 44 so as to compensate for perturbations in the angular position of this mirror (with reference to a stationary or fixed outside inertial reference frame—not with reference to the vehicle) which are caused by vehicle movements. That is, jitter of the image provided to the user in the azimuthal plane (which would result from movements and jostling of the vehicle 16) is removed by stabilizing the mirror 28.

Turntable 38 pivotally carries an H-shaped arm 50 to which is secured an arcuate gear rack 52. The H-shaped arm 50 includes respective elongate arm portions 50' and 50". A pair of pintle pins 54 define the pivotal connection of the arm 50 with turntable 38, and define the axis 34. A coarse-elevational actuator 56 is carried on a flange 58 extending from the turntable member 38. This actuator 56 includes a rotational pinion gear 60 drivingly engaging the gear rack 52. The actuator 56 includes a rotary variable differential transformer (RVDT), or resolver, which is indicated with the numeral 56' providing a respective coarse elevational angular position signal. The user of the apparatus 10 may remotely move the view provided in the elevational plane by indirectly causing operation of the actuator 56 to pivot the arm 50 about the axis 34.

At an end of the arm 50 opposite to its pivotal support by the turntable member 38, the arm 50 carries a fine-elevational sensor and actuator assembly, generally indicated with the numeral 62. This fine-elevational sensor and actuator assembly 62 includes a cross bar member 64, which is pivotally carried between the two opposite sides of the H-shaped arm 50 by pintle pins 66. Those ordinarily skilled in the pertinent arts will recognize that pivotal supports of kinds than pins (like pintle pins 66) may be provided. For example, crossed-leak flexures may be used to support the cross bar 64 from the arm 50. The pintle pins 66 cooperatively define a fine-elevational axis 66' for the mirror 28. A mirror head 68, which carries the mirror 28, mounts to the cross arm member 64 by a stem 70 located near the geometric and mass center of this mirror head 68. The stem 70 is received into a hole (not seen in the drawing Figures) formed in the cross bar member 64 near the center thereof. Again, those ordinarily skilled in the pertinent arts will recognize that the mirror 28, mirror head 68, and stem 70 may be integrally formed with one another. The mirror head 68 is rigidly mounted relative to the cross bar member 64. Adjacent to opposite ends of the cross bar member 64, the latter defines a pair of apertured ears 72 and 74.

In the aperture of the ear 72 is received a two-axis fine-elevational angular rate sensor 76, which is responsive to angular rates about the fine-elevational axis 66' defined by the pintle pins 66. The sensor 76 is also responsive to rates about a second orthogonal axis perpendicular to the fine elevational axis so that a second rate signal is also obtained from this sensor. In the aperture of ear 74 is received a fine-elevational actuator 78. This actuator 78 is of the voice-coil type and expands and contracts to change in length in response to an applied fine-elevational compensation signal. The fine-elevational actuator 78 acts on a tab 80 projecting from the cross bar portion 82 of the H-shaped arm 50. Thus, the cross bar member 64 is angularly dithered slightly (i.e., through an angle of about five degrees) about the axis 66' in response to extension or contraction of the actuator 78. An angular position sensor in the form of a linear variable differential transformer (LVDT) 84 is carried in a small apertured tab 86 of the cross bar portion 82 of the H-shaped arm 50. This LVDT 84 includes a relatively movable sensing stem 88 attached to the cross bar member 64. Again, those ordinarily skilled in the pertinent arts will recognize that other types of position sensors may be employed in practicing the present invention. This LVDT 84 provides an electronic feedback signal indicative of the compensated angular position of the mirror head 68 (and of mirror 28). Thus, the angular position of the mirror head 68 in its limited fine-elevation range of angular movement is known from the signal provided by the sensor 84.

In order to counterbalance the arm 50, mirror head 68, and other components mounted to the arm 50, one of the pintle pins 54 includes an extended portion 90 and is drivingly related to the H-shaped arm 50. A counterbalance arm 92 of hammer-shape is pivotally secured to the turntable 38 by a pin member 94. That is, the counterbalance arm 92 includes a comparatively enlarged head portion 92' so that the arm 92 overall has a generalized hammer-shape. The pin 94 also includes an extended portion 96 of the same diameter as the portion 90, and is drivingly associated with the counterbalance arm 92. Drivingly connecting the portions 90 and 96 of the one pin 54 and of the pin 94 is a metallic belt-like member 98. This belt member 98 is formed into a complete loop which wraps around each of the portions 90 and 96, and is secured thereto by, for example, a respective one of a pair of screws each passing through a corresponding hole in the belt-like member 98 and threadably securing into the respective pin portion 90 and 96. Thus, the belt member 98 drivingly connects the H-shaped arm 50 and counterbalance arm 92 to move in synchronization with one another. These arms 50 and 92 move in the same direction of angular motion, and remain always substantially in mutual parallelism.

The mass moment of the counterbalance arm 92 about the pin 94 is selected to be substantially equal to that of the arm 50, along with the mirror head 68 and other components mounted to the arm 50. Consequently, when the arm 50 is moved angularly about the axis 34 to move the view provided by the apparatus 10 in the elevational plane, the counterbalance arm moves in parallelism with the arm 50 so that these two arms counterbalance each other. Also, in the event that the apparatus 10 is exposed to a vertical acceleration which would otherwise jiggle the arm 50 and mirror head 68 causing the view provided to a viewer to also jiggle, the mass moment of the arms 92 and 50 oppose and counter each other so that the jiggle of the mirror head 68 is substantially eliminated. For example, if the vehicle 16 were to hit a bump so that a vertically-upward acceleration were applied to the apparatus 10, then the arm 50 would also tend to droop. Moreover, the counterbalance arm 92 would tend to droop in opposition to the arm 50. Because the moments of the arms 92 and 50 are selected to be substantially the same, the resulting moments at the pins 54 and 94 are also equal. The opposing moments from the arms 50 and 92 are applied in opposition to one span of the belt 98 (in this case, the upper span of this belt), and counter each other. A similar situation applies in the event that a vertically downward acceleration is applied to the apparatus 10.

Figure 3A:
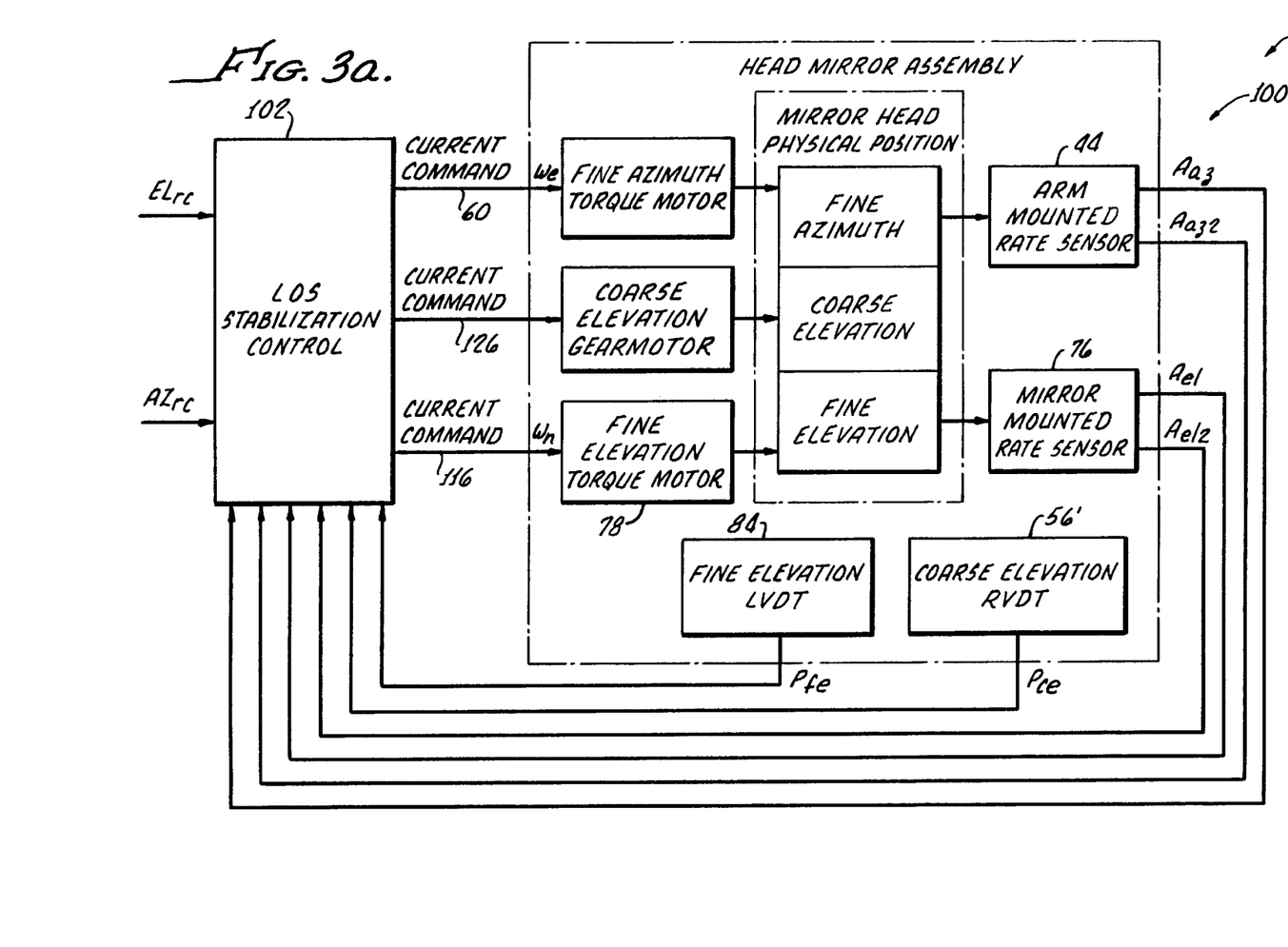
FIGS. 3a and 3b provide related block diagrams of a control system for use in conjunction with the apparatus seen in FIGS. 1 and 2.
Figure 3B:
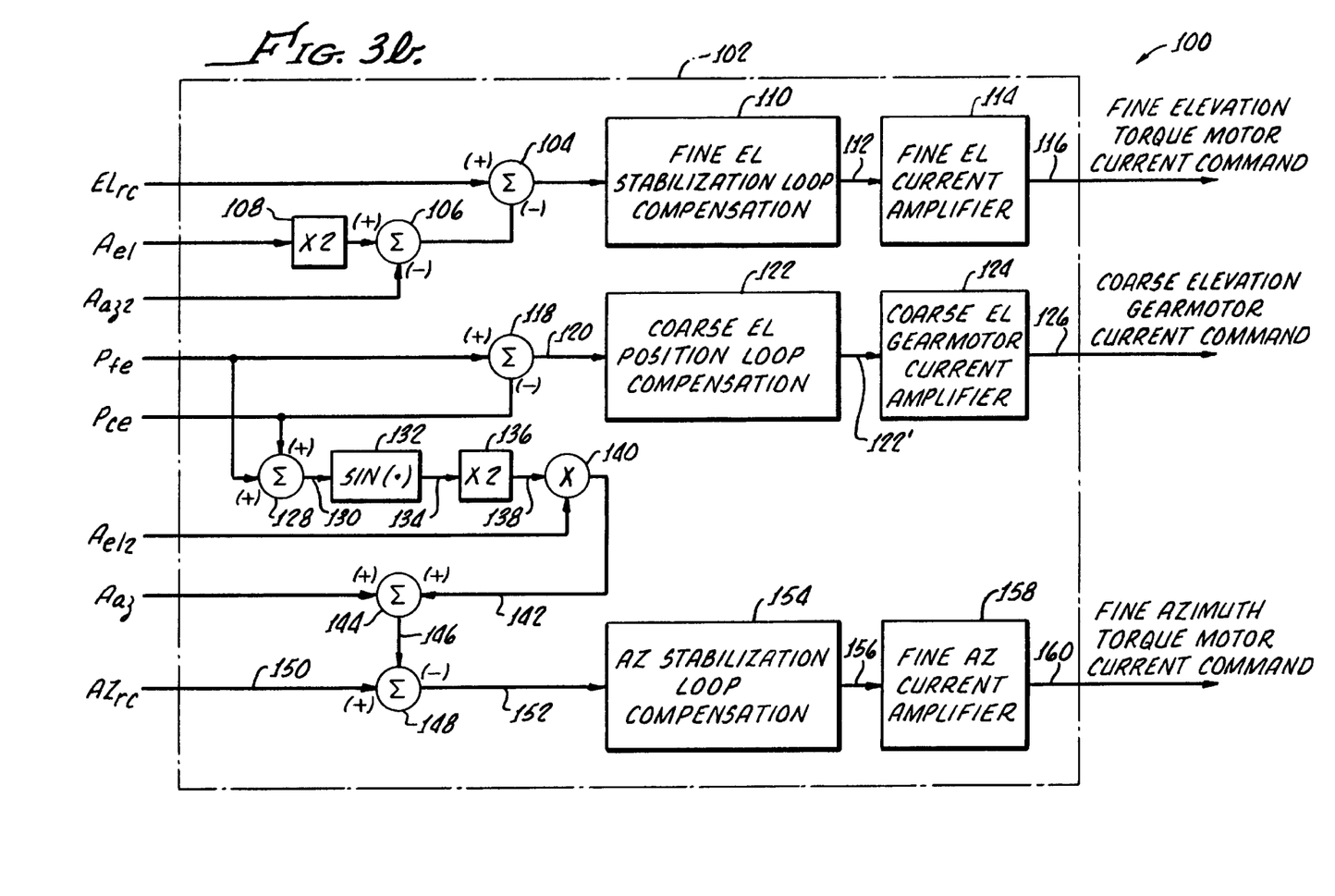

Viewing now FIGS. 3a and 3b, a diagrammatic representation of a feedback control system 100 for use with apparatus 10 is presented. In overview, viewing FIGS. 3a and 3b, it is seen that the control system 100 includes the angular rate sensors 44, and 76. These two sensors respectively provide signals indicative of inertial angular rate of the mirror head 68 about the vertical azimuthal axis 42 (indicated on FIGS. 3 with the character $A_{az}$), and also the second signal from this sensor 44 (indicated with the character $A_{az2}$); while sensor 76 provides signals for inertial angular rate of the mirror head 68 about the fine elevational axis 66' (which is indicated with the character $A_{el}$) along with the second acceleration signal from this sensor (indicated as signal $A_{el2}$). These signals are conveyed to a LOS stabilization control 102.

Also provided to the control 102 are signals $P_{fe}$ and $P_{ce}$, respectively provided by the LVDT 84 and RVDT 56'. Controller 102 additionally receives a signal $El_{rc}$ (Elevation rate command) indicative of the user's commanded movement of the line of sight in the elevational direction, as was explained earlier. Also the controller 102 is capable of receiving and responding to a signal $AZ_{rc}$ indicative of the users commanded movement of the line of sight in the azimuthal direction. This additional signal would be used in instances in which it is desired to steer the line of sight in small movements under the user's command along the horizontal direction without having to make coarse adjustments of the vehicle turret or submarine periscope tube which would otherwise be necessitated for such movements of the line of sight. As can be readily appreciated, this additional facility of the viewing apparatus may be implemented with the device described above simply by providing the user with a remote control device (not shown) having both an elevational and azimuthal input capability. No change to the apparatus of the viewing device 10 described above is necessary to implement this additional horizontal (azimuthal) steering of the line of sight in response to a user input.

Viewing now FIG. 3b, it is seen that the controller 102 includes a summing junction 104 receiving both the signal $EL_{rc}$ from the user of the viewing apparatus 10, and a signal (as a negative value) from a summing junction 106. The junction 106 provides the indicated signal to junction 104 as a sum of the signal $A_{az2}$ (as a negative value), and a conditioned signal originating with the signal $A_{el}$. A signal doubling unit 108 receives the signal $A_{el}$ to effectively amplify this signal by a factor of two and to supply the resulting doubled signal to summing junction 106. Because of the near-perfect inertial counterbalancing effective in the elevational direction, as explained above, the fine-elevation control facility of the controller 102 can effect precise control of the mirror 68 in the fine elevational direction using only a stabilization loop compensation element 110 effecting the following function:

$$G(s) = \frac{K\left(1 + \frac{s}{\omega_z}\right)\left(1 + \frac{s}{\omega_i}\right)}{\left(1 + \frac{s}{\omega_p}\right)s} \quad \text{(equation 1)}$$

In which K is a gain constant, $\omega_z$ and $\omega_p$ are lead-lag networks, and $\omega_i$ is an integral-lead network. The servo parameters $\omega_z$, $\omega_p$ and $\omega_i$ are selected to provide a desired stabilization band width.

The fine elevational loop compensation element 110 provides a command signal along conductor 112, which is amplified by amplifier 114. The amplifier 114 provides the control signal (indicated with arrowed reference numeral 116) to the fine elevation actuator 78, recalling FIG. 2. It will be noted that in order to provide the smoothest and most linear response of the line of sight to an elevational position change command from the operator, the operator's input signal $El_{rc}$, is not provided directly to the coarse position servo 56 (recalling FIG. 2), but is provided instead as an input to the fine-position servo actuator 78. To prevent the fine-elevation servo 78 from driving against its physical stops, the coarse position servo 56 is slaved to the fine-elevation servo 78. That is, the coarse elevation error is calculated as the difference between the fine elevation position angle of the mirror head 68, and the coarse elevation angle indicated by signal $P_{ce}$. Viewing FIG. 3b it is seen that the two signals $P_{fe}$ and $P_{ce}$ are summed at a summing junction 118 (with signal $P_{ce}$ having a negative value), and the resulting difference signal (indicated at arrowed reference numeral 120) is provided to a coarse-position loop compensation element 122 effecting the following relationship:

$$G_P(s) = \frac{K_p\left(1 + \frac{s}{\omega_{pz}}\right)}{\left(1 + \frac{s}{\omega_{pp}}\right)} \quad \text{(equation 2)}$$

In which $K_p$ is a gain constant, $\omega_{pz}$ and $\omega_{pp}$ are lead-lag networks, and the servo parameters are selected to provide a desired coarse-position loop band width. The coarse-position loop compensation element 122 provides an output signal (indicated with arrowed reference numeral 122') to a coarse-position amplifier 124. Amplifier 124 provides signal 126 to coarse position actuator 56, recalling FIG. 2. Because the fine-position servo system has a sufficiently broad band width and a sufficiently fast response time, cogging of the line of sight in the elevational direction which would otherwise result because of engagements of the gear teeth of pinion 60 with gear rack 52 as the operator commands a movement of this line of sight in the elevational direction are compensated for by actuator 78. That is, the arm 50 may cog slightly in its angular position, but the operator does not visually detect the cogging because of compensatory angular adjustments of the assembly 62 and mirror head 68 relative to the arm 50.

Still viewing FIG. 3b, it is seen that another summing junction 128 also receives the signals $P_{fe}$ and $P_{ce}$. However, this summing junction 128 receives these signals both as positive values, so that the resulting signal (indicated with arrowed numeral 130) has the value of these two signals added together. The resulting signal 130 is acted upon by a trigonometric function generator 132, which finds the sine of the angular value represented by the sum of $P_{fe}$ and $P_{ce}$ together. A resulting sine-value signal (indicated by arrowed numeral 134) is doubled by multiplier circuit 136 (effectively an amplifier with a gain factor of 2). The resulting doubled sine-valued signal (indicated by arrowed numeral 138) is then multiplied by the signal $A_{el2}$ at multiplier 140. The resulting multiplied and doubled sine-valued signal (indicated with arrowed numeral 142) is added to signal $A_{az}$ at summing junction 144. The resulting signal (indicated with arrowed numeral 146) is routed (as a negative value) through a summing junction 148 at which a signal 150 indicative of a commanded azimuthal slew rate from a user of the viewing apparatus may be added if desired, as described above. A resulting signal (indicated with arrowed reference numeral 152) is provided to a azimuthal stabilization loop compensation element 154 functionally effecting the same operation as was indicated for element 110, and as was indicated by equation 1 set out above. A resulting signal 156 is provided to an amplifier 158, which provides an amplified signal 160 to the torque motor 46, recalling FIG. 2 again.

As a result of the signal processing described above, the controller effects the following control algorithms of the mirror head 68 with respect to the sensed variable values indicated above:

Elevation Signal$_{126}$=2$A_{el}$−$A_{az_2}$

Azimuth Signal$_{160}$=$A_{az}$+2 $A_{el_2}$ sin ($E_f$+$E_c$)

As a result of this signal processing and angular compensation of the mirror head 68, the line of sight of a user of the viewing apparatus is compensated for movements and angular perturbations of the vehicle or other platform upon which the apparatus 10 is carried. That is, movements of the vehicle are compensated for, and angular disturbances of the vehicle which could cause the line of sight to change because of undesired effect on the viewing apparatus 10 itself are also compensated for. This compensation is effective on the line of sight provided to the user of the apparatus, not just on the angular position of the mirror head 68 relative to an inertial reference frame (recalling that the viewer moves with the vehicle 16 so that the viewer's line of sight would move even if the mirror 68 were stabilized relative to an inertial reference frame), and regardless of the angle of the line of sight of the user with respect to the movement axes of the vehicle. That is, if the user is looking forward so that the user's line of sight is parallel to the forward movement axis of the vehicle, it is easily understood that pitch and yaw of the vehicle will be compensated for by respective elevational and azimuthal adjustments of the mirror head 68. With a forward line of sight, roll of the vehicle simply is seen as a tilting of the scene viewed.

However, if (for example) the line of sight is at 45 degrees to the line of motion, then pitch, yaw, and roll of the vehicle will all have components of angular disturbance affecting both the elevational and azimuthal axes of the mirror head 68. Under this and similar situations, the present invention provides true stabilization of the line of sight of the viewing apparatus 10 by sensing angular rates about the elevation and azimuth axes, and by also combining angular rate components sensed at two orthogonal axes relative to the mirror head 68 (i.e., by use of the signals indicative of angular rates about the respective elevational and azimuthal axes, as well as the additional orthogonal signals from the two-axis rate sensors 44 and 76), along with sensed angular positions of the mirror head relative to the vehicle itself, in order to provide compensatory signals to each of the actuators 46 and 78.

Also, because the user's input to the viewing device to move the line of sight in the elevational plane is applied to the fine elevational axis, and not to the coarse elevation axis, the user is first of all assured that the apparent movement of the line of sight in elevation on the scene is as responsive and yet as smooth as possible. That is, the interrelationship of the coarse elevation axis and the fine elevational axis is employed for movement for the line of sight so that the response of the apparatus 10 to the user's input to the viewing device is smoothed by the direct application of the LOS stabilization facility at its most sensitive and responsive level. Cogging of the actuator pinion gear 60 on rack 52 is automatically compensated for and is not visible to the user. Thus, the user of the device is further assured a smooth and jitter-free view of the scene being observed.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A viewing apparatus for selectively directing the line-of-sight of a viewer, said viewing apparatus comprising:
   a mirror for reflecting light from a scene to provide an image of the scene for the viewer;
   a support structure pivotally holding said mirror, said support structure including a support arm pivoting near a first end thereof about a support arm pivot axis on said support structure for selectively varying an elevational angle of said mirror relative to the scene, said support arm near an opposite second end thereof supporting said mirror, wherein the weight of said mirror and said support arm exert a mirror torque about said support arm pivot axis;
   a counterbalance pivotally connected at a first end thereof to said support structure about a counterbalance pivot axis, wherein the weight of said counterbalance exerts a counterbalance torque about said counterbalance pivot axis, and wherein said support arm pivot axis is substantially parallel to said counterbalance pivot axis; and
   a linkage coupling said counterbalance pivot axis to said support arm pivot axis with a flexible belt-like member so that said mirror torque and said counterbalance torque oppose one another upon movement of said mirror.

2. The viewing apparatus of claim 1 wherein said counterbalance includes an arm pivoted on said support structure.

3. The viewing apparatus of claim 1 wherein said counterbalance includes an extended portion adjacent said counterbalance pivot axis and said linkage connects said extended portion with said support arm.

4. The viewing apparatus of claim 3 wherein said support arm includes a corresponding extended portion, and said belt-like member drivingly engages said extended portion of said support arm so that said support arm and said counterbalance arm move in synchronization.

5. The viewing apparatus of claim 1 wherein said counterbalance is generally of hammer shape and includes a relatively enlarged head portion spaced from said counterbalance pivot axis.

6. The viewing apparatus of claim 1 wherein said support arm and said counterbalance move in synchronization with one another in the same direction of angular motion to substantially remain mutually parallel with one another.

7. The viewing apparatus of claim 1 wherein said support structure is also pivotally movable about a vertically oriented azimuthal axis, thereby to provide an user of the viewing apparatus with a line-of-sight also movable in azimuth.

8. The viewing apparatus of claim 1 further including a control system for stabilizing the line of sight of the viewer in opposition to perturbations of said support structure, said control system including a pair of two-axis angular rate sensors each providing a pair of output signals one of which is indicative of an angular rate of said mirror about a respective one of an elevational axis and an azimuthal axis, and the other of which is indicative of angular rate of said mirror about an axis orthogonal to said respective one of said elevational or azimuthal axis.

9. The viewing apparatus of claim 8 wherein said control system includes a pair of angular position sensors each providing a respective output signal indicative of angular position of said mirror.

10. The viewing apparatus of claim 9 wherein said control system includes a loop stabilization calculator providing a feedback signal for use in stabilizing said mirror according to the expression:

$$G(s) = \frac{K\left(1 + \frac{s}{\omega_z}\right)\left(1 + \frac{s}{\omega_i}\right)}{\left(1 + \frac{s}{\omega_p}\right)s}$$

in which G is the Laplace transform of the stabilization loop compensation, S is the Laplace operator, K is a gain constant, $\omega_z$ and $\omega_p$ are lead-lag networks, and $\omega_i$ is an integral-lead network, and the servo parameters $\omega_z$, $\omega_p$ and $\omega_i$ are selected to provide a desired stabilization band width for said viewing apparatus.

11. The viewing apparatus of claim 10 wherein said viewing apparatus further includes a coarse-elevation actuator pivoting said support arm relative to said support structure, and a fine elevation actuator pivoting said mirror relative to said support arm, said control system including a coarse elevation position loop compensator effecting the following relationship for said coarse elevation actuator:

$$G_p(s) = \frac{K_p\left(1 + \frac{s}{\omega_{pz}}\right)}{\left(1 + \frac{s}{\omega_{pp}}\right)}$$

in which $G_p(s)$ is the Laplace transform of the position loop compensation, S is the Laplace operator, $K_p$ is a gain constant, $\omega_{pz}$ and $\omega_{pp}$ are lead-lag networks the parameters of which are selected to provide a desired coarse-position loop band width for said viewing apparatus.

12. The viewing apparatus of claim 10 wherein said control system includes circuitry effecting the following relationships among said signals from said pair of two-axis angular rate sensors, and said output signals from said pair of angular position sensors indicative of angular position of said mirror:

Elevation Signal$_{126}$=2$A_{el}$-$A_{az2}$

Azimuth Signal$_{160}$=$A_{az}$+2 $A_{el2}$sin($E_f$+$E_c$)

in which $A_{az}$ and $A_{az2}$ represents the two output signals from one of said two-axis rate sensors, $A_{el}$, and $A_{el2}$ represents the two output signals from the other of said two rate sensors, $E_f$, and $E_c$ represents said output signals from said pair of angular position sensors indicative of angular position of said mirror.

13. A method of operating a viewing apparatus for selectively steering in elevation the line-of-sight of a viewer viewing a scene outwardly through an aperture, said method including steps of:

providing a mirror;

reflecting from said mirror light from said scene which passes inwardly through said aperture to provide an image of said scene to said viewer;

providing a support structure movably holding said mirror for pivotal movement about a horizontal elevational axis;

providing said support structure with apparatus for selectively varying an angle of said mirror about said horizontal elevational axis relative to the scene to selectively steer the viewer's line-of-sight in elevation;

providing said support structure with a selectively movable support arm pivoting near a first end thereof on said support structure; utilizing said support arm to pivotally support said mirror near an opposite second end thereof so that said support arm is undesirably pivotal in response to acceleration of said support structure thereby altering the angle of said mirror and undesirably moving the line-of-sight in elevation;

providing a counterbalance carried on said support structure;

moving said counterbalance in response to said acceleration of said support structure; and linking said counterbalance to said support arm using a flexible belt-like member so that movement of said counterbalance in response to said acceleration opposes said undesirable pivoting of said support arm and said mirror, thereby to eliminate said undesirable alteration of the angulation of said mirror and undesirable movement of the line-of-sight in elevation.

14. The method of claim 13 further including the steps of:

configuring said counterbalance as an arm member, and pivoting said counterbalance arm member on said support structure.

15. The method of claim 13 further including the steps of:

using said flexible belt-like member to cause said counterbalance to move in substantial synchronization with said support arm.

16. The method of claim 13 further including the steps of:

using said flexible belt-like member to cause said counterbalance and said support arm to move in synchronization with one another in the same direction of angular motion so as to substantially remain mutually parallel with one another.

17. The method of claim 13 further including the steps of:

configuring said counterbalance to be generally of hammer shape and to include a relatively enlarged head portion spaced from a pivotal connection of said counterbalance with said support structure.

18. A viewing apparatus for selectively directing the line-of-sight of a viewer, said viewing apparatus comprising:

a mirror for reflecting light from a scene to provide an image of a scene for the viewer;

a support structure pivotally holding said mirror, said support structure including a support arm pivoting near a first end thereof about a support arm pivot axis on said support structure for selectively varying an elevational angle of said mirror relative to the scene, said support arm near an opposite second end thereof supporting said mirror, wherein the weight of said mirror and said support arm exert a mirror torque about said support arm pivot axis;

a counterbalance pivotally connected at a first end thereof to said support structure about a counterbalance pivot axis, wherein the weight of said counterbalance exerts a counterbalance torque about said counterbalance pivot axis, and wherein said support arm pivot axis is substantially parallel to said counterbalance pivot axis;

a linkage coupling said counterbalance pivot axis to said support arm pivot axis with a flexible belt-like member so that said mirror torque and said counterbalance torque oppose one another upon movement of said mirror; and a control system for stabilizing the line of sight of the viewer in opposition to perturbations of said support structure, said control system including a pair of two-axis angular rate sensors each providing a pair of output signals one of which is indicative of an angular rate of said mirror about a respective one of an elevational axis and an azimuthal axis, and the other of which is indicative of an angular rate of said mirror about an axis orthogonal to said respective one of said elevational axis or said azimuthal axis.

19. The viewing apparatus of claim 18 wherein said control system includes a pair of angular position sensors each providing a respective output signal indicative of angular position of said mirror.

20. The viewing apparatus of claim 18 wherein said control system includes a loop stabilization calculator providing a feedback signal for use in stabilizing said mirror according to the expression:

$$G(s) = \frac{K\left(1 + \frac{s}{\omega_z}\right)\left(1 + \frac{s}{\omega_i}\right)}{\left(1 + \frac{s}{\omega_p}\right)s}$$

in which G is the Laplace transform of the stabilization loop compensation, S is the Laplace operator, K is a gain constant, $\omega_z$ and $\omega_p$ are lead-lag networks, and $\omega_i$ is an integral-lead network, and the servo parameters $\omega_z$, $\omega_p$ and $\omega_i$ are selected to provide a desired stabilization band width for said viewing apparatus.

21. The viewing apparatus of claim 20 wherein said control system includes circuitry effecting the following relationships among said signals from said pair of two-axis angular rate sensors, and said output signals from said pair of angular position sensors indicative of angular position of said mirror:

Elevation Signal$_{126}$=2A$_{el}$-A$_{az2}$

Azimuth Signal$_{160}$=A$_{az}$+2 A$_{el2}$sin(E$_f$+E$_c$)

in which A$_{az}$ and A$_{az2}$ represents the two output signals from one of said two-axis rate sensors, A$_{el}$, and A$_{el2}$ represents the two output signals from the other of said two rate sensors, E$_f$, and E$_c$ represents said output signals from said pair of angular position sensors indicative of angular position of said mirror.

22. The viewing apparatus of claim 18 wherein said viewing apparatus further includes a coarse-elevation actuator pivoting said support arm relative to said support structure, and a fine-elevation actuator pivoting said mirror relative to said support arm, said control system including a coarse elevation position loop compensator effecting the following relationship for said coarse elevation actuator:

$$G_p(s) = \frac{K_p\left(1 + \frac{s}{\omega_{pz}}\right)}{\left(1 + \frac{s}{\omega_{pp}}\right)}$$

in which G$_p$(s) is the Laplace transform of the position loop compensation, S is the Laplace operator, K$_p$ is a gain constant, $\omega_{pz}$ and $\omega_{pp}$ are lead-lag networks the parameters of which are selected to provide a desired coarse-position loop band width for said viewing apparatus.

23. A rotatable turret for selectively directing the line-of-sight of a viewer within a military vehicle, said turret comprising:

a mirror for reflecting light from a scene to provide an image of the scene for the viewer;

a two or more axis remotely powered articulate support structure pivotally holding said mirror, said support structure including a support arm pivoting near a first end thereof about a support arm pivot axis on said support structure for selectively remotely varying an elevational angle of said mirror relative to the scene, said support arm near an opposite second end thereof supporting said mirror, wherein the weight of said mirror and said support arm exert a mirror torque about said support arm pivot axis;

a coarse actuator remotely controlled by the viewer for driving said mirror about said elevational angle;

a counterbalance pivotally connected at a first end thereof to said support structure about a counterbalance pivot axis, wherein the weight of said counterbalance exerts a counterbalance torque about said counterbalance pivot axis, and wherein said support arm pivot axis is substantially parallel to said counterbalance pivot axis; and a linkage coupling said counterbalance pivot axis to said support arm pivot axis so that said mirror torque and said counterbalance torque oppose one another upon movement of said mirror.

24. The turret of claim 23 wherein said counterbalance includes an arm pivoted on said support structure.

25. The turret of claim 23 wherein said counterbalance includes an extended portion adjacent said counterbalance pivot axis and said linkage connects said extended portion with said support arm.

26. The turret of claim 23 wherein said support arm and said counterbalance arm move in synchronization with one another in the same direction of angular motion to substantially remain mutually parallel with one another.

27. The turret of claim 23 wherein said support structure is also remotely pivotally movable by the viewer about a vertically oriented azimuthal axis, thereby to provide the viewer with a line-of-sight also movable in azimuth.

28. The turret of claim 23 further including control system for stabilizing the line of sight of the viewer in opposition to perturbations of said support structure, said control system including a pair of two-axis angular rate sensors each providing a pair of output signals one of which is indicative of an angular rate of said mirror about a respective one of an elevational axis or an azimuthal axis, and the other of which is indicative of angular rate of said mirror about an axis orthogonal to said respective one of said elevational or azimuthal axis.

29. The turret of claim 28 wherein said control system includes a pair of angular position sensors each providing a respective output signal indicative of angular position of said mirror.

30. The turret of claim 28 further comprising a fine actuator controlled by said line of sight stabilizing control system for driving said mirror about said elevational angle in opposition to said perturbations.

* * * * *